Jan. 11, 1949.　　　　B. M. OLIVER　　　　2,459,117
OBJECT LOCATING SYSTEM
Original Filed Feb. 24, 1944　　　　5 Sheets-Sheet 1

INVENTOR
B. M. OLIVER
BY
Hugh S. Wertz
ATTORNEY

Jan. 11, 1949. B. M. OLIVER 2,459,117
OBJECT LOCATING SYSTEM
Original Filed Feb. 24, 1944 5 Sheets-Sheet 2

INVENTOR
B. M. OLIVER
BY
Hugh J. Wertz
ATTORNEY

Jan. 11, 1949.  B. M. OLIVER  2,459,117
OBJECT LOCATING SYSTEM
Original Filed Feb. 24, 1944  5 Sheets-Sheet 3

INVENTOR
B. M. OLIVER
BY
Hugh S. Wertz
ATTORNEY

Jan. 11, 1949.  B. M. OLIVER  2,459,117
OBJECT LOCATING SYSTEM
Original Filed Feb. 24, 1944  5 Sheets-Sheet 4

INVENTOR
B. M. OLIVER
BY
Hugh S. Wertz
ATTORNEY

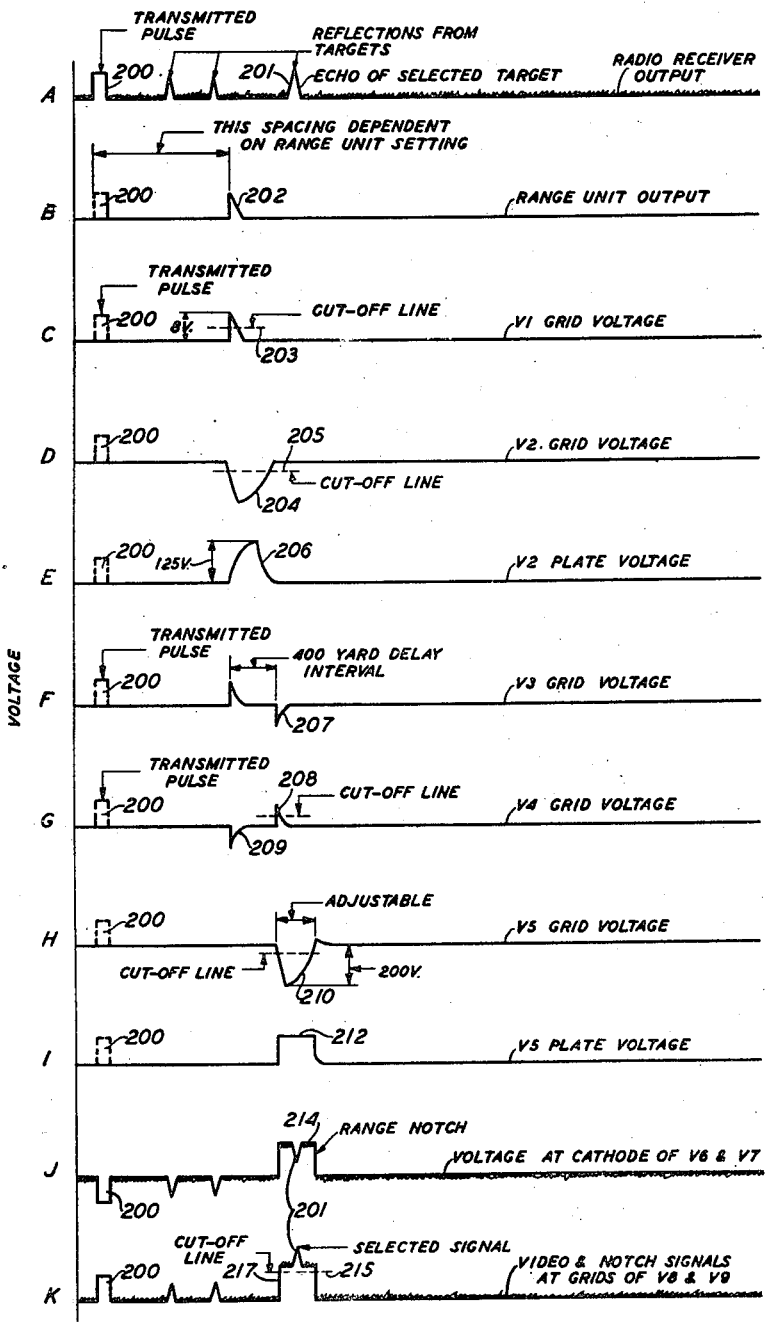

Patented Jan. 11, 1949

2,459,117

UNITED STATES PATENT OFFICE 2,459,117

OBJECT LOCATING SYSTEM

Bernard M. Oliver, New York, N. Y., assignor to Bell Telephone Laboratories, Incorporated, New York, N. Y., a corporation of New York Original application February 24, 1944, Serial No. 523,722. Divided and this application March 19, 1945, Serial No. 583,472

3 Claims. (Cl. 343—7)

This invention relates to pulse operated circuits and more specifically to object locating and distance measuring systems. This application is a division of application Serial No. 523,722, filed February 24, 1944 and which issued as Patent 2,451,632 on October 19, 1948.

Radio object locating and distance measuring systems (frequently called "radar" systems) are known in which radio frequency pulses of very short time duration (called "transmitted pulses" or "emitted pulses") are emitted at intervals, reflections thereof are received from objects upon which the emitted pulses impinge and the reflection delay times for particular reflections are determined to provide indications of the distances of the objects from which the respective reflected pulses are received. Radar systems of the type in which the beam of the antenna is continually moved so that its axis "follows" or "tracks" the target are also known. In one such radar, a rotating wave guide scanner is turned about the axis of a paraboloidal reflector. The wave guide has an aperture which is displaced somewhat to one side of the axis so that as the scanner rotates around the axis of the reflector, the axis of the radio beam describes a cone in space. When the axis of the reflector is pointed directly at a target in space, the radio beam does not point squarely at the target and hence strikes it with somewhat less than maximum intensity. However, since the radio beam is describing a cone in space about the reflector axis, it continues to project substantially the same amount of power toward the target at all positions in the scanning cycle. On the other hand, if the target moves off the reflector axis, the beam at one part of its scan points more directly at the target while in the diametrically opposite part of its scan the beam points farther away from the target. In such a situation the echo pulses produced, each representative of the selected target, vary in amplitude at the frequency of rotation of the rotating antenna. The motor turning the antenna scanner at a low frequency, such as for example, 60 cycles, is known as the lobing motor and this low frequency rotation is known as the lobing frequency. The modulation content of the wave at the lobing frequency is a measure of the amount of angular displacement between the antenna axis and a direct line from the antenna to the target and can be utilized to produce two signals to move the antenna through horizontal and vertical angles until the antenna axis and the line of sight to the target coincide. However, due to the fact that the signal wave comprising successive echoes from the same target comprises a multiplicity of pulses of comparatively narrow width separated by periods of much greater duration during which no signal is received, the modulation component at the lobing frequency is very small. In a typical radar, 480 radio frequency pulses (called the "transmitted pulses" or "emitted pulses") are emitted each second, and each transmitted or emitted pulse has a duration of about one microsecond. Because in this typical case the pulse separation is about 2000 times the pulse duration, and also because the amount of pulse amplitude modulation at lobing frequency is very small (usually not more than 5 percent) when the antenna is "off target" by the maximum permissible amount, it can be seen that most of the frequency components which account for the amplitude of the wave produced by the echoes from a particular target consist of the pulse repetition frequency and its high harmonics with small side frequencies while the component at the lobing frequency itself is very small. For example, if the pulse amplitude somewhere in the above radar system were 50 volts modulated 5 per cent, the video signal component at lobing frequency would be less than about 1 millivolt. To amplify this component up to the required amplitude of several volts without system overload, it is necessary to filter out all components of a frequency greater than the lobing frequency. This is very difficult to accomplish without excessive phase shift at the lobing frequency.

It is an object of this invention to provide an object locating and distance measuring system employing a rotatable antenna which introduces a low "lobing" frequency in the received signal wave and utilizing means for transforming a wave produced from said signal wave, said wave comprising a succession of echoes from a particular target, into a wave in which the low frequency modulation content is greatly increased.

Another object is to provide a following system utilizing the modulation of a train of short widely spaced pulses modulated in amplitude in accordance with the position of the following element to control said position in which means are provided for increasing the effectiveness of the modulation control.

Another object of the invention is to provide a novel pulse transforming system for changing a series of short, distantly spaced pulses which, as a whole, are amplitude modulated into a like number of relatively long closely spaced pulses forming a series of the same duration as said first series and correspondingly amplitude modulated.

In accordance with the specific embodiment of this invention, chosen by way of example for purposes of illustration, there is disclosed an object locating and distance measuring system employing a wave transforming circuit which for convenience has been called a "lobing detector" inasmuch as it "detects" or makes usable the modulation component of a wave comprising a plurality of relatively short pulses spaced apart by relatively long time intervals, said pulses being modulated at the lobing frequency. In a specific form of the invention, the lobing detector comprises a condenser charged to a fixed potential shortly before the reception of a selected video pulse and which is partially discharged a few microseconds later by the received selected video echo signal from the target being tracked. The discharge of the condenser is thus caused to vary in amount in accordance with the modulation of the lobing frequency. This lobing frequency component of the condenser voltage is the desired signal that is used to operate the angle tracking system to vary the position of the antenna axis so that it is "on target" in both elevation and azimuth, or, in other words, so that the error angle in azimuth (horizontal angle) and elevation (vertical angle) is reduced to substantially zero.

The invention will be more readily understood by referring to the following description taken in connection with the accompanying drawings forming a part thereof in which:

Figs. 6, 7 and 8 are diagrammatical and graphical representations to aid in understanding the invention.

Figure 1:
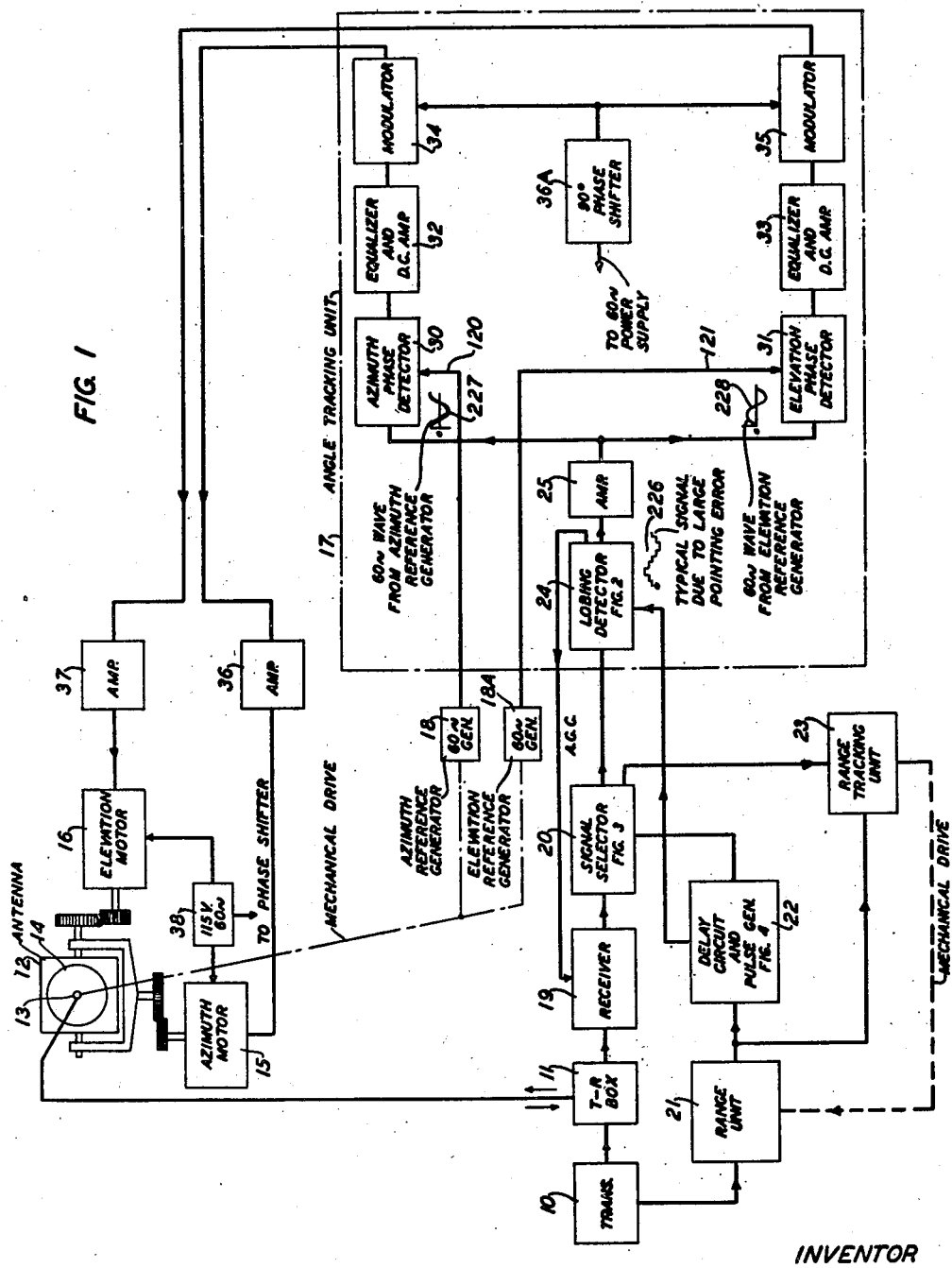
Fig. 1 is a schematic block diagram of a radar system in accordance with the invention employing a wave transformer or lobing detector.

Referring more particularly to the drawings, Fig. 1 shows, by way of example for illustrative purposes, an automatic tracking radar system in the three coordinates of range (slant distance to the target from the observing station), azimuth (horizontal angle between a reference direction and the vertical plane containing the line of sight to the target) and elevation (the vertical angle between the horizontal plane and the line of sight to the target). Fig. 1 is a single line block diagram to show the relationship of the various major elements of the system and is not intended to be a circuit diagram. It is to be understood that only elements necessary to show the operation of the wave transforming circuit or lobing detector of this invention have been shown and that various elements of an automatic tracking radar system in three coordinates, such as, for example, the oscilloscope and details of the range detector unit, have not been shown inasmuch as they are not necessary to explain the action of the lobing detector.

In the arrangement of Fig. 1, an ultra-high frequency pulse modulated wave is produced in a transmitter 10. The transmitter may comprise, for example, a high voltage rectifier of any suitable form which supplies about 12,000 volts to a suitable charging circuit or element capable of producing a still higher voltage. After the charging voltage builds up to about 21,000 volts, any suitable rotary spark gap discharges the capacitor in the charging circuit. This discharge takes place in about one microsecond and causes the magnetron oscillator in the transmitter to oscillate for this brief period and send short pulses of radio frequency energy through a T-R box 11 to the antenna system 12. A suitable antenna system is disclosed in an application by A. P. King, Serial No. 499,450, filed August 21, 1943 and in a corresponding British Patent 586,689, complete accepted March 27, 1947.

The antenna arrangement may, for example, comprise an open-ended circular antenna wave guide 13, the longitudinal axis of which is angularly related to the principal axis of the paraboloidal reflector 14. The aperture at the open end of the guide is in the focal plane of the reflector and placed a small distance to the side of the reflector axis. The antenna guide is connected to the T-R box by means of a stationary main transmission guide extending perpendicularly to the reflector axis and ultra-high frequency pulse modulated waves are supplied to and collected from the guide. Means (not shown in Fig. 1) are provided for rotating the axis of the short wave guide about the reflector axis, and therefore for rotating the center of the aperture about the reflector focus, whereby the axis of the maximum directive lobe describes in space a cone of substantially circular cross-section, and lobe nutation is secured without moving the reflector 14. Means are also provided for moving the arrangement for the purpose of aligning the reflector axis, which coincides with the axis of the directive cone, with any direction in space. This means comprises, by way of example, an azimuth motor 15 for varying the horizontal angle between the reflector axis and the line between the antenna and the target and an elevation motor for varying the vertical angle between the reflector axis and the line between the antenna and the selected target it is desired to follow or track. The operation of the azimuth and elevation motors 15 and 16 is controlled by signals from an angle tracking unit 17 to be described below. Mounted so as to rotate with the antenna scanner 13 are two low frequency generators represented by the boxes 18 and 18—A. These two generators, which are called the lobing generators, generate sinusoidal waves at the lobing frequency, that is, the frequency of rotation of the wave guide antenna 13 and which are 90 degrees apart in phase. These waves are applied to the respective azimuth and elevation phase detectors 30 and 31 in the angle tracking unit 17 and are used as reference waves.

Radio frequency pulses emitted by the antenna 13 and reflected by the reflector 14 strike one or more objects and produce reflections or echoes therefrom which are received by the same antenna system and transmitted through the T-R box 11 to the receiver 19. The T-R box may be of any desirable type, for example that employing a Western Electric Company 709-A tube in a resonant cavity. This tube is filled with an ionizable gas and has a small gap therein. During reception, with the low voltages of the received energy, the gas is not ionized, the cavity is tuned to resonance and the received energy is applied to the receiver 19. During the transmission of a pulse from the transmitter 10, the voltages due to the pulse ionize the gas, thus detuning the cavity and substantially preventing most of the energy of the pulse from reaching the receiver 19.

Figure 3:
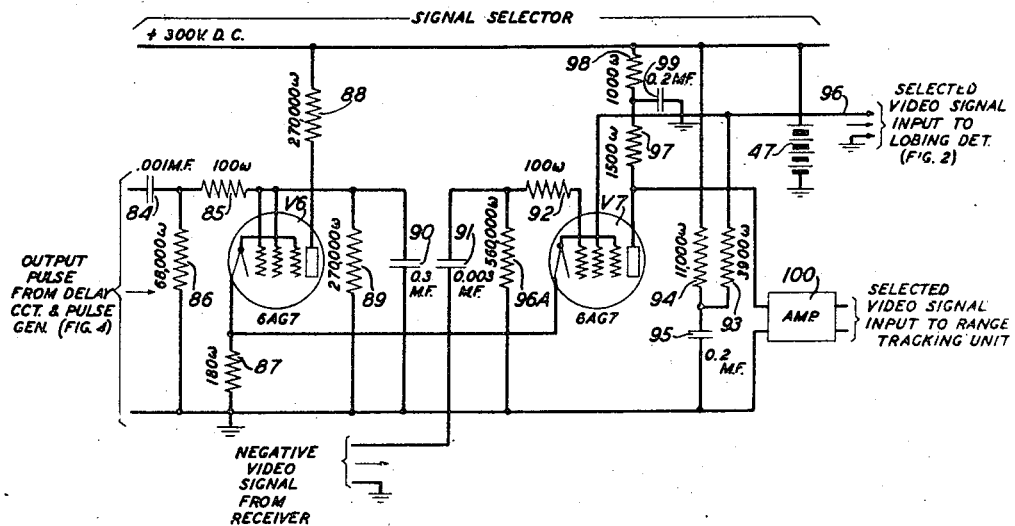
Fig. 3 is a circuit diagram of the signal selector used in the system of Fig. 1.

In the receiver 19 the received waves are heterodyned to a convenient intermediate frequency and these intermediate frequency waves are amplified, detected, and applied to the signal selector 20 a circuit diagram of which is shown in Fig. 3.

Figure 4:
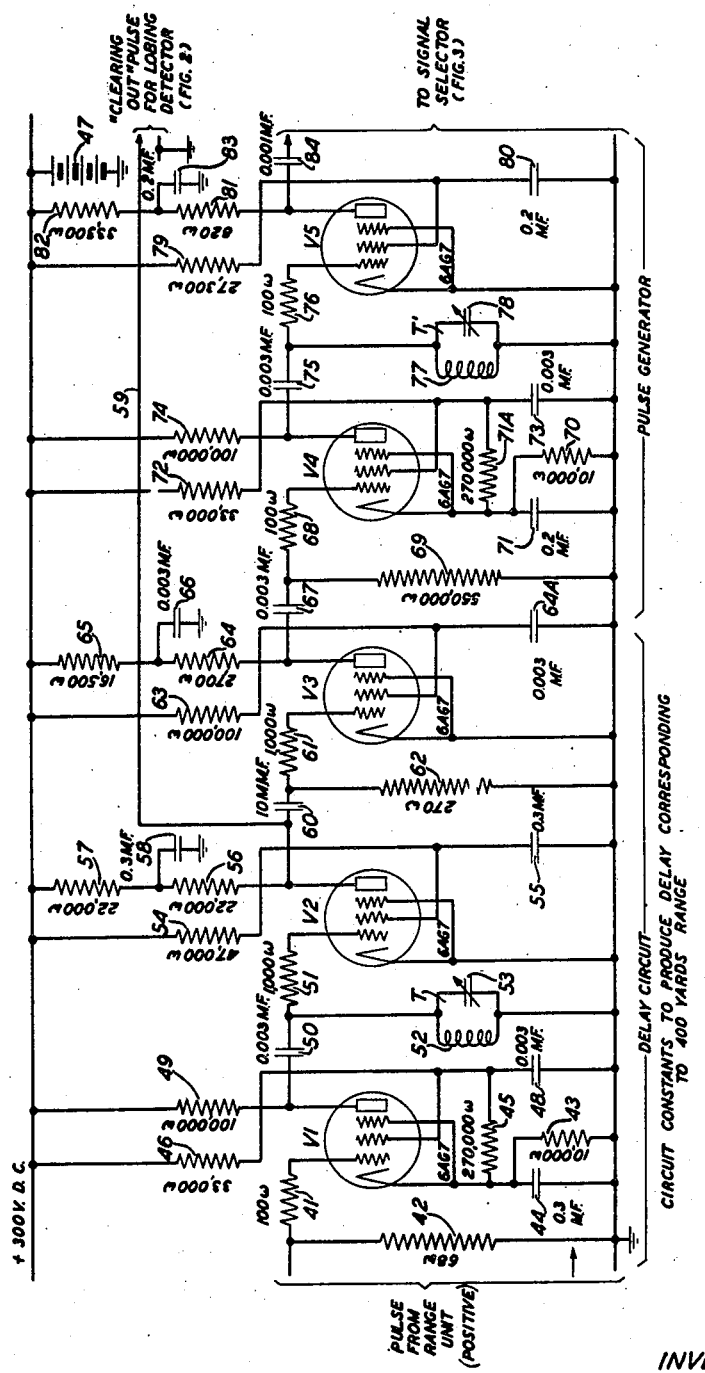
Fig. 4 is a circuit diagram of the delay circuit and pulse generator used in the system of Fig. 1.

Pulse energy from the transmitter 10, in the nature of a synchronizing pulse, controls the range unit 21 which is essentially a variable delay circuit or unit and produces a pulse 202 (see Fig. 8–B) of predetermined length a controllable period of time after the initiation of the pulse from the transmitter 10. A suitable range is disclosed in an application of L. A. Meacham, Serial No. 491,791, filed June 22, 1943 and which issued as Patent 2,422,204 on June 17, 1947. The output pulse from the circuit 21 is applied to a delay circuit and pulse generator 22 which, for example, produces a pulse 212 (see Fig. 8–I) which has a duration corresponding to a range of, for example, 400 yards, the pulse starting after a time interval shown in Fig. 8–F, corresponding to a range of 400 yards from the start of the pulse in the range unit 21. The unit 22 is shown in Fig. 4 and will be described more fully below. The output pulse from the range unit 21 is also applied to a range tracking unit 23 which is mechanically coupled (this connection being indicated by the dash line between the units 23 and 21) to the range unit 21 to vary a condenser therein in such a way as to vary the time each output pulse in the range unit is delayed from the corresponding unit pulse from the transmitter 10. Inasmuch as the present invention does not relate to automatic range tracking no details are given herein of the range tracking unit but reference is made to a copending application of B. M. Oliver, Serial No. 523,721, filed February 24, 1944 which shows, by way of example, an arrangement utilizing signals from a signal selector and pulses from a range unit to produce a voltage which drives a motor in one direction or the other to vary the delay period in the range unit in such a manner that the target is tracked in range.

Figure 2:
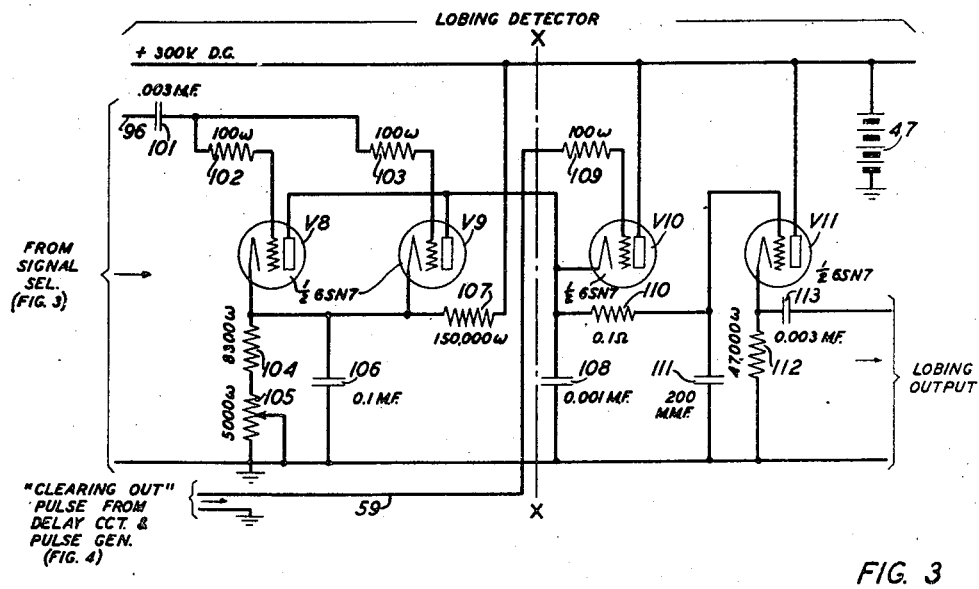
Fig. 2 is a circuit diagram of the wave transformer or lobing detector.
Figure 6:
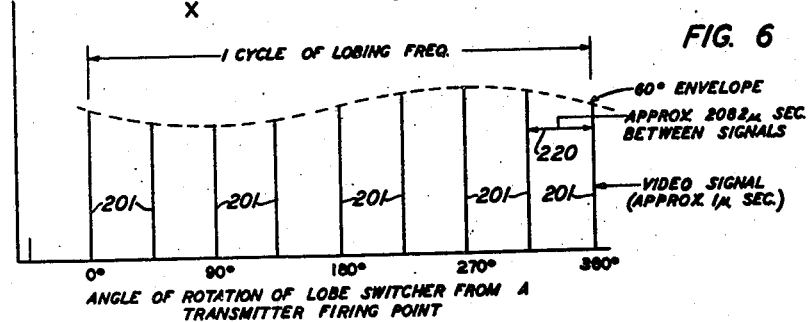

The delay circuit shown in Fig. 4 produces a pulse, called a "clearing out pulse" to be described more fully below, which is applied to the device shown in Fig. 2 and which, for convenience, will be designated the "lobing detector." A selected portion of the video signal from the receiver is taken from the signal selector 20 and applied to the input of the lobing detector as indicated in Fig. 2. This input (as shown in Fig. 6) comprises a plurality of relatively short echo pulses 201 (all from the same target) separated by relatively long intervals 220 of practically no signal energy. If the antenna is said to be "on-target," that is, if its reflector axis passes through the target, all of the pulses 201 will be of substantially the same amplitude but if the antenna is not aimed directly at the target, the received pulses 201 from the selected target will be stronger in one position of the antenna than in another due to the fact that the lobe is highly directional. The pulses 201 will under these conditions have an envelope at the lobing frequency which, for example, is 60 cycles. For an arrangement wherein 480 pulses are transmitted per second and assuming that each transmitted pulse has a duration of about 1 microsecond there is a period of time 220 of approximately 2082 microseconds between successive video or echo signals 101 from the selected target, that is, from the target being tracked or followed by the movement of the antenna reflector axis. It will be apparent from a consideration of Fig. 6 that the modulation content at the lobing frequency of 60 cycles is very small being equal to the direct current component of the signal multiplied by the modulation index (per cent modulation divided by 100). Most of the frequency components which account for the amplitude of the pulse modulation exist as small side bands about the pulse frequency and its numerous high harmonics, the component at the modulating frequency being by itself very small. The present invention in one of its more important aspects is concerned with the extraction from a pulse wave of the general type shown in Fig. 6 information as to variation in amplitude of the lobing frequency and the utilization of such information to aim the antenna. The lobing detector 24 produces a substantially sinusoidal wave at the lobing frequency which is amplified by the amplifier 25 and applied to both the azimuth phase detector 30 and the elevation phase detector 31 of the angle tracking unit 17. There signals are produced which are applied (through amplifiers 36 and 37, respectively) to the motors 15 and 16 to drive these motors in a direction to align the axis of the antenna with the line of sight to the selected target both in azimuth and elevation. Before going into a detailed description of how the output wave of the lobing detector 24 is produced and the manner in which it is utilized in the rest of the angle tracking unit 17 to control the azimuth and elevation motors 15 and 16, respectively, reference will be made to Figs. 2, 3 and 4 which are circuit diagrams of the elements 24, 20 and 22, respectively, represented by boxes in the system of Fig. 1.

Reference will first be made to Fig. 4 which discloses a circuit 22 for producing a pulse 212 (see Fig. 8–I) which has a duration corresponding to a range of 400 yards and the initiation of which is delayed by a period of time corresponding to a range of 400 yards after the initiation pulse from the range unit 21. This circuit also produces the "clearing out" pulse 206 (see Fig. 8–E) for the lobing detector 24. The circuit 22 comprises tubes V1, V2, V3, V4 and V5, the first three of which make up the so-called "delay circuit" and the last two of which form the pulse generator for generating the delayed pulse 212 having a duration corresponding to 400 yards range. The function of the delay circuit comprising the tubes V1, V2 and V3 is to produce a pulse 208.

The range unit output pulse, shown in Fig. 8–B as the pulse 202, is applied to the control element of the tube V1 through resistor 41, a grid leak resistor 42 being connected in the circuit between the control element and ground. The cathode is connected directly to the suppressor grid and to ground through the parallel connected resistor 43 and condenser 44 to apply bias to the grid. The cathode is placed at a positive potential with respect to ground by means of a voltage-dividing potentiometer comprising resistances 43, 45 and 46 while the screen grid is placed at positive potential with respect to ground by means of the resistor 46 which is connected to the positive terminal of a source 47 of approximately 300 volts. The negative terminal of the source 47 is connected to ground. The screen grid is also connected to ground through the condenser 48. The anode is connected to the positive terminal of the source 47 through resistor 49 and is connected to the control element of the tube V2 through condenser 50 and resistor 51. Between the common terminal of the elements 50 and 51 and ground is a tuned circuit T comprising inductance member 52 and adjustable capacity member 53 of a few micromicrofarads. The cathode of the tube V2 is connected directly to ground and to the suppressor grid. The screen grid is connected through the resistance member 54 to the positive terminal of the source 47 and through the condenser 55 to ground. The anode of the tube V2 is connected through the resistors 56 and 57 to the positive terminal of the source 47, the common terminal of resistances 56 and 57 being connected to ground through the condenser 58. The anode of the tube V2 is connected by means of a connection 59 to the lobing detector 24 shown in Fig. 2 and through a condenser 60 and a resistance 61 to the control element of the tube V3, a resistor 62 being connected between the common terminal of the members 60 and 61 and ground. The cathode of the tube V3 is connected directly to ground and to the suppressor grid while the screen grid is connected to the positive terminal of the source 47 through the resistor 63 and to ground through the condenser 64—A. The anode of the tube V3 is connected through the resistors 64 and 65 to the positive terminal of the source 47, the common terminal of the members 64 and 65 being connected to ground through the condenser 66. The anode of the tube V3 is also connected to the control element of the tube V4 through the condenser 67 and the resistance 68, the common terminal of the members 67 and 68 being connected to ground through the leak resistor 69. The cathode of the tube V4 is connected directly to the suppressor grid and through the parallel-connected resistance member 70 and condenser 71 to ground. The cathode is placed at a positive potential with respect to ground by means of the voltage-dividing potentiometer between the positive terminal of the source 47 and ground comprising the resistances 70, 71A and 72. The screen grid is placed at a positive potential by means of a connection to the positive terminal of the source 47 through the resistor 72 and is connected to ground through the condenser 73. The anode of the tube V4 is connected to the positive terminal of the source 47 through the resistor 74 and is connected to the control element of the tube V5 through condenser 75 and resistor 76, the common terminal of these last two members being connected to ground through the tuned circuit T' comprising the parallel-connected inductance member 77 and the adjustable condenser 78 of only a few micromicrofarads. The cathode of the tube V5 is directly connected to the suppressor grid and to ground. The screen grid is connected to the positive terminal of the source 47 through the resistor 79 and is connected to ground through the condenser 80. The anode of the tube V5 is connected to the positive terminal of the source 47 through the resistors 81 and 82, the common terminal of these last two members being connected to ground through the condenser 83. The anode of the tube V5 is also connected through the coupling condenser 84 to the control element of the tube V6 in Fig. 3.

The operation of the circuit arrangement in Fig. 4 will now be described. The grid of the tube V1 is biased below cut-off because of the connection of the cathode to the positive terminal of the source 47 through the voltage divider comprising the resistances 43, 45 and 46. When the pulse 202 is applied to the tube V1, it conducts plate current for the instant that this grid is above the cut-off voltage. The cut-off line 203 is shown in Fig. 8–C. The condenser 50 has been charged from the 300-volt "B" supply through the resistor 49. When V1 draws plate current during the pulse, condenser 53 is suddenly charged negatively through the path comprising condensers 44 and 50 and tube V1. The plate voltage drop is about 200 volts and the grid of the tube V2 is driven negative by the same amount. The L-C network T begins an oscillation which is quenched after one-quarter cycle because the voltage across it begins to swing positive and the grid of the tube V2 begins to draw current. The oscillatory voltage has practically the same form as the pulse 204 shown in Fig. 8–D which is the grid voltage curve of the tube V2. The cut-off line 205 for the tube V2 is also shown in this figure. The large negative grid voltage 204 applied to the grid of tube V2 cuts off this tube for a length of time equal to one-fourth of the period of one oscillation of the network T and produces a plate voltage wave having the shape shown in Fig. 8–E. The sloping sides of this wave are caused by the condenser 60 and the total stray capacity of the lead 59 shunting the resistor 56 but do not interfere with the operation of the lobing detector circuit to which this wave is applied by means of the connection 59. The grid of the tube V3 is coupled to the plate of the tube V2 through the 10-micromicrofarad condenser 60. This condenser and the 270-ohm resistance 62 have a very short time constant and differentiate the plate voltage wave produced on tube V2 to a form shown in Fig. 8–F, the pulse 207 in this figure being delayed from the pulse 202 by a time interval corresponding to substantially 400 yards range. The differentiated pulse 207 is amplified and changed in polarity by the tube V3 to produce a pulse 208 having the wave form shown in Fig. 8–G. This output is applied to the grid of the tube V4 which is biased below cut-off by connecting its cathode to the B voltage supply 47 through the voltage divider arrangement comprising the resistances 70, 71A and 72. The positive pulse 208 applied to the control grid causes the plate voltage of this tube to drop suddenly (obviously the negative pulse 209 has no effect on the tube). Network T' starts to oscillate, but the oscillation stops at the end of one-quarter cycle when the grid of the tube V5 begins to swing positive and draw a grid current. The operation of the tube V4 is similar to that of tube V1 except that its grid pulse has been delayed by the time of one-quarter cycle of an oscillation of the network T (corresponding to 400 yards range). The grid voltage wave 210 of the tube V5 is shown in Fig. 8–H. Tube V5 is cut off by this large negative grid voltage and produces an output voltage pulse 212 similar to that shown in Fig. 8–I. This voltage is applied to the grid of the tube V6 in the signal selector circuit shown in Fig. 3. The length of the pulse 212 shown in Fig. 8–I corresponds to a range of approximately 400 yards and it starts after a time interval corresponding to a range of approximately 400 yards after the range unit pulse 202 shown in Fig. 8–B. The length of the pulse produced by the pulse generators V4 and V5 may be adjusted by means of the condenser 78.

Reference will now be made to Fig. 3 which shows tubes V6 and V7 and their associated circuit connections which comprises a suitable signal selector 20. The output pulse 212 from the tube V5 of Fig. 4 is applied to the control grid of the tube V6 through the coupling condenser 84 and the resistor 85, the common terminal of these last two elements being connected to ground through the resistor 86. The cathode of the tube V6 is connected to ground through a resistor 87 and is also directly connected to the suppressor grid. The anode and screen grid of the tube V6 are connected to the positive terminal of the source 47 through the resistor 88 and to ground through the resistor 89 which is shunted by a condenser 90. Tube V6 serves as a cathode follower, the output connection being made from the cathode of the tube V6 to the cathode of the tube V7. The video signal from the receiver 19, shown by Fig. 8-A and comprising for each transmitted pulse cycle a pulse 200 representative of a transmitted pulse and one or more pulses which are reflections or echoes from the targets (the pulse representing the target to be followed being designated by the reference character 201) is applied to the control grid of the tube V7 through the coupling condenser 91 and the resistor 92. The common terminal of the members 91 and 92 is connected to ground through the resistor 96A. The cathode of the tube V7 is connected to the suppressor grid thereof while the screen grid is connected to the positive terminal of the source 47 through the resistors 93 and 94, the common terminal of these two resistors being connected to ground through the condenser 95. The output from the signal selector 20 shown in Fig. 3 to the lobing detector of Fig. 2 is taken from the screen grid of the tube V7 through the connection 96. The anode of the tube V7 is connected to the positive terminal of the source 47 through resistors 97 and 98, the common terminal of these resistors being connected to ground through the condenser 99. The anode of the tube V7 is connected to an amplifier 100, the output of which is applied to the range tracking unit 23. The manner in which such a selected signal is utilized for range tracking is described, by way of example in the copending application of B. M. Oliver, Serial No. 523,721, filed February 24, 1944.

The operation of the signal selector shown in Fig. 3 will now be described. This circuit, acting as a gate, permits only those signals which occur within a certain small range (time) interval to be passed on to operate the automatic ranging equipment which includes the range tracking unit 23 and the lobing detector 24 the output of which is used for automatic angle tracking. In this process of selection, video signals from the receiver 19 represented in Fig. 8-A are combined with the 400-yard pulse 212 which is present in the output of the tube V5. The combination of these two is effected in the tube V7. The pedestal pulse 212 having a 400-yard width and a 400-yard delay behind the range pulse 202 obtained at the plate of the tube V5 is applied to the grid of the tube V6. The cathode current and voltage across the cathode resistor 87 follow the voltage applied to the grid of this tube. The positive potential across the resistor 87 is also applied to the cathode of the tube V7 since the resistor is common to both circuits. This has the effect of placing a more negative bias on the grid of the tube V7 during the application of positive pulses 212 to the grid of the tube V6. The incoming video signals from the receiver 19 are applied in the negative phase (as shown in Fig. 8-J) to the grid of the tube V7. Both the video and pedestal pulses, therefore, cause a decrease in the plate current and a rise in the plate voltage of the tube V7. If the echo pulse corresponding to the desired target occurs within the time span of the pulse 212, the two will be superposed as shown in Fig. 8-J, the echo 201 forming a notch in the pedestal pulse 214. In the operation of the range tracking unit 23, as described, for example, in the copending application of B. M. Oliver, Serial No. 523,721, filed February 24, 1944, the range unit is controlled from the range tracking unit 23 in such a way that the output pulse from the range unit occurs at a time which will cause the pedestal pulse 214 to bracket the echo pulse 201 corresponding to the selected target. The output of the signal selector 20, which is applied to the tube V8 of the lobing detector 24 shown in Fig. 2 by means of the connection 96, the condenser 101 and the resistor 102, and to the control element of the tube V9 thereof through the elements 96, 101 and 103, is shown in Fig. 8-K. As shown in this figure, only those video signals within the time span of the pulses 212 pass through the signal selector. The tubes V8 and V9 are connected in parallel so as to amplify the signals applied to their common control elements. The two cathodes are connected together and each is connected to ground through resistors 104 and 105 in series, the latter of which is adjustable. The condenser 106 is connected in parallel with the series-connected circuit comprising the elements 104 and 105. The anodes of the tubes V8 and V9 are connected together and through the anode-cathode path of the tube V10 to the positive terminal of the source 47. The cathodes of the tubes V8 and V9 are placed at a positive potential by means of the voltage divider comprising the resistors 105, 104 and 107. The cathode of the tube V10 is connected to ground through the condenser 108. The control element of the tube V10 is connected by means of the resistor 109 and the connection 59 to the anode of the tube V2 in the delay circuit shown in Fig. 4. The potential appearing across the condenser 108 is applied through resistance 110 to the control grid of the tube V11, this grid being connected to ground through the condenser 111. The cathode of the tube V11 is connected to ground through the resistor 112 and the anode of the tube V11 is connected directly to the positive terminal of the source 47. The lobing output wave is taken from across the resistance 112 through the coupling condenser 113.

Figure 7:
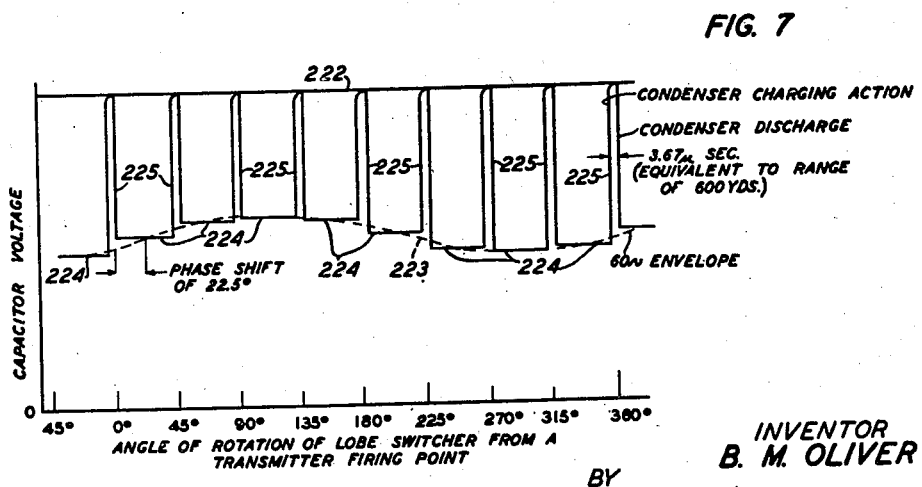

The operation of the lobing detector will now be described. The lobing detector, as indicated in the system of Fig. 1, is part of the angle tracking unit 17. Its function is to extract the 60-cycle lobing frequency from the selected receiver video signal and pass this frequency to the rest of the angle tracking unit. Referring to Fig. 6, the pulses 201 correspond to the pulses 201 in Fig. 8-K, there being one of these pulses for every transmitted pulse and thus they are approximately 2082 microseconds apart. There is no signal energy in the wave between the pulses 201. If the antenna 12 does not have its reflector axis aimed at the target, the pulses 201 will lie under a 60-cycle sinusoidal envelope, there being one complete cycle of the 60-cycle lobing frequency for every eight pulses, or in other words, for every complete rotation of the wave guide 13 eight pulses will be emitted. If the antenna axis is "off-target" the pulses emitted at some points of the rotation of the antenna will, because of the highly directional sensitivity of the antenna, produce a larger amplitude echo pulse 201 than others and the envelope 221 will be a sine wave the amplitude of which and the phase of which (with respect to the two reference waves generated by the 60-cycle generators 18 and 18—A) can be used to generate signals to center the antenna with respect to the target. Inasmuch as the wave of Fig. 6 has a low modulation content at the lobing frequency, the lobing detector is essentially a wave transformer as it produces an output wave, such as that shown in Fig. 7, which has a much larger modulation content at the lobing frequency. Referring now to Fig. 2, the grid of the tube V10 is connected to the plate of the tube V2 in the 400-yard delay circuit, and the large positive plate voltage pulse 206, Fig. 8–E, carries the grid of V10 positive, beginning with the start of the range unit pulse 202 and lasting for the 400-yard delay interval. The condenser 108 in the cathode circuit of the tube V10 charges during the period that the grid of this tube is carried positive by the pulse 206. When the grid voltage decreases, the tube V10 is cut off and the condenser 108 remains charged. The above charging action occurs immediately after the range unit pulse 202. The selected signal shown above the cut-off line 215 in Fig. 8–K and which is applied to the tubes V8 and V9 in parallel occurs after the range unit pulse 202 by a time equivalent to the 400-yard delay interval plus one-half the 400-yard range pulls 212, or 600 yards. It follows then that the condenser 108 will have been charged and left at its maximum potential (represented by the line 222 in Fig. 7) before the video signal is applied to the lobing detector by means of the connection 96. The cathode bias of the tubes V8 and V9 is adjusted so that only signals on top of the 400-yard range pedestal 217 in Fig. 8–K cause the tubes V8 and V9 to conduct. Since the ungrounded side of the condenser 108 is connected to the plates of the tubes V8 and V9, this condenser is partially discharged when the selected signal of Fig. 8–K causes plate current to flow in V8 and V9. The amount by which the condenser 108 is discharged is dependent upon the amount of plate current flowing in the tubes V8 and V9 and therefore upon the amplitude of the signal pulse applied to the grids thereof. If the antenna is not pointing exactly at the target, the amplitude of the selected echo pulses 201 from the receiver will vary at the lobing frequency (as explained above in connection with Fig. 6) and the potential to which the condenser 108 is discharged will vary from pulse to pulse at this same rate. After the condenser 108 is partially discharged, it maintains this value of charge until it is again charged at the time of the next range unit 202 pulse. The voltage on the condenser 108 will have a wave shape similar to that shown in Fig. 7, and will have a large lobing frequency component as indicated by the dotted line 223 which is drawn through the midpoints of horizontal line 224 representing the voltages to which condenser 108 is partially discharged by the successive pulses. This component 223 has a time delay of about one-half the interval between two successive transmitted pulses or 1/960 of a second. This corresponds to a phase delay of about 22½ degrees (with 8 pulses per scan) which is compensated by shifting the phases of the reference waves from the generators 18 and 18A as will be pointed out below. The voltage across the condenser 108 is applied through the resistor 110 to the grid of the tube V11 which operates as a cathode follower output tube. The low-pass filter action of the resistor 110 and the condenser 111 reduces the spikes 225 of the wave shown in Fig. 7 and a signal is produced (if the pointing error is large) like the typical signal 226 shown in Fig. 1. This signal is amplified in any suitable amplifier 25 and applied to the azimuth and elevation phase detectors 30 and 31.

The lobing detector 24 delivers to the two phase detectors 30 and 31 a constant voltage if the antenna is "on-target" or, if it is not on target, a 60-cycle voltage whose amplitude and phase indicates the antenna pointing error. If the antenna is pointed directly at a target, as pointed out above, all reflected pulses will be of the same magnitude because the antenna beam, or lobe, will sweep around in a cone, the axis of which will pass through the target. Under this condition, there will be no modulation of the video signal and a constant voltage only will be delivered to the azimuth and elevation phase detectors 30 and 31. If the antenna is not pointed directly at the target, stronger echoes will be received from lobes nearer the target than from those further away and since the speed of the lobe switching motor, that is, the motor (not shown) rotating the wave guide 13, is, for example, 3600 revolutions per minute, this results in a 60-cycle per second modulation of the reflected signal. It is the function of the rest of the angle tracking unit 17 to transform the 60-cycle lobing input into control voltages to drive the azimuth and elevation motors 15 and 16, thus changing the position of the antenna so that it will point directly at the selected target. Actually two control voltages are developed: one proportional to the antenna error in azimuth and one proportional to the antenna error in elevation. The amplitude and polarity of each control voltage denotes the magnitude and direction of the corresponding antenna pointing error.

As shown in the block diagram of Fig. 1, the modulated and amplified echo pulses are applied to the azimuth and elevation phase detectors 30 and 31, respectively. Two 60-cycle voltages 227 and 228, balanced with respect to ground and which are 90 degrees out of phase with each other, are obtained from the two 60-cycle generators 18 and 18—A (if desired, the members 18 and 18—A can be a single two-phase generator) are used as reference waves for determining the instantaneous position of the antenna lobe. The azimuth reference wave 227 would normally have a maximum when the axis of the antenna beam is at its maximum horizontal displacement from the reflector axis and the elevation wave 228 would normally have a maximum when the axis of the antenna beam is at its maximum vertical displacement from the reflector axis were it not for the phase shift produced by the lobing detector. Because of this phase shift, the phases of the reference waves are shifted accordingly to compensate for it. One voltage 227 is applied to the azimuth phase detector 30 by means of the connection 120 and the other reference voltage is applied to the elevation phase detector 31 by means of the connection 121. Each phase detector produces an output voltage which is proportional to the component in phase with its particular reference carrier wave. Any suitable phase detector may be utilized; for example, reference is made to the double tube arrangement in Patent 1,539,903, issued June 2, 1925, to L. M. Ilgenfritz for producing such a voltage component. The phase detector 30 comprises, for example, a double vacuum tube circuit wherein the grids of both tubes are varied in potential at a phase difference of 180 degrees by means of the reference wave 227 while the wave 226 is applied to the grid-cathode circuit of both tubes in the same phase. If the phase displacement between waves 226 and 227 is zero or 180 degrees (called the in-phase condition) a maximum signal is produced in the output circuit of the phase detector. A lobbing signal 90 degrees or 270 degrees out of phase with the reference frequency wave 227 results in no signal voltage in the output circuit. If the phase of the lobing signal is between these two conditions, the output will be a signal voltage, the amplitude of which is somewhere between zero and the maximum obtained for the in-phase condition, depending on the phase difference. The elevation phase detector 31 is similar to the device 30 except that the reference wave 228 is applied between the grids of the two tubes so that the voltages of the grids are 180 degrees apart instead of using the wave 227 in this manner as in the device 30. The same lobing signal 226 is applied to both the azimuth and elevation phase detectors, but since the 60-cycle reference waves 227 and 228 for these two detectors are 90 degrees out of phase with each other, the resultant voltages will change in different manners. For example, when the lobing frequency is in phase (or 180 degrees out of phase) with the azimuth reference wave 227, it will be 90 degrees out of phase with the elevation reference wave 228. This means that for this condition a signal voltage will be produced for controlling the azimuth circuit but no voltage will be produced in the elevation circuit. Obviously, for other conditions, signals representing errors in both azimuth and elevation will be produced in the output circuits of the devices 30 and 31.

The outputs of the phase detectors 30 and 31 after being amplified by the devices 32 and 33 are applied to the modulators 34 and 35, respectively, each of which may be, for example, of the copper-oxide bridge type disclosed in Patent 2,025,158 issued December 24, 1935 to F. A. Cowan. Also connected to each of these modulators is a 60-cycle carrier wave derived from the power line and a phase shifting network 36A connected to the source 38. With no direct current input to each modulator, no 60-cycle voltage appears in the modulator output. When a signal voltage is applied to the modulator 34, for example, there appears at the modulator output a proportional 60-cycle voltage which either leads or lags the voltage of the source 38 by 90 degrees, depending on the polarity of the signal voltage. The outputs of the modulators 34 and 35 are applied to amplifiers 36 and 37, respectively, and the outputs of these two amplifiers are applied to the azimuth and elevation motors 15 and 16, respectively, to drive the antenna until it is "on-target" and thereby reduce the azimuth and elevation "error voltages" to zero.

Figure 5:
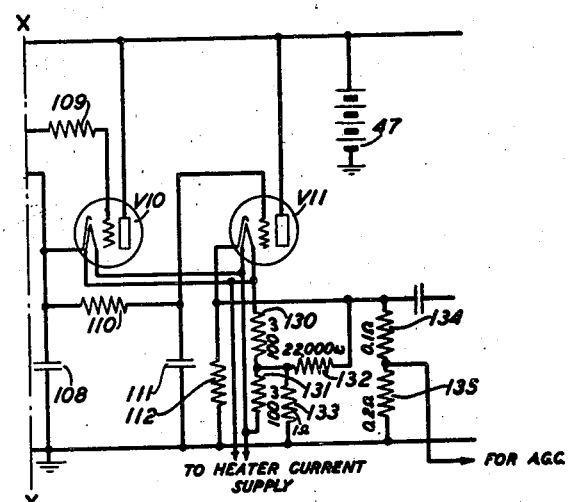
Fig. 5 shows a modification of the lobing detector of Fig. 2.

Fig. 5 shows a modification of the arrangement shown in Fig. 2. In Fig. 5 portions to the left of the line X—X are intended to be the same as the portions to the left of the line X—X in Fig. 2 so they have not been reproduced in this figure. Moreover, in Fig. 5 all elements having the same reference characters as the corresponding elements in Fig. 2 are similar and operate in a similar manner. The arrangement of Fig. 5 differs from that of Fig. 2 in that the average potential of the heater for the cathodes in the tubes V10 and V11 is made to follow the potential of the cathode of V10. This is accomplished by means of the equal resistors 130 and 131, the common terminal of which is connected through resistor 132 to the cathode of the tube V11 and through resistor 133 to ground. Resistors 132 and 133 serve as a voltage dividing potentiometer, their common terminal being at a potential less than the cathode of V11 by an amount equal to the bias across that tube and hence at the potential of the grid of V11 and the cathode of V10. This prevents or greatly minimizes leakage between the cathode and heater of either of these tubes and especially V10, thus preventing the charge of the condenser 108 from leaking off during the interval between pulses and thereby producing an inaccurate output signal from the lobing detector.

Since the amount by which the condenser 108 is discharged each cycle is proportional to the selected signal pulse strength, the average potential of this condenser and hence of the cathode of V11 will be less, the greater the average selected signal strength. This variation in potential can be used to control automatically the receiver gain by well-known automatic gain control methods in such a manner as to hold the average selected signal strength substantially constant over a wide range of receiver input.

The circuit constants of an operative form of the invention have been indicated on the drawing but it is to be understood that the invention is not limited to the use of these specific circuit constants as a change of one or more of the variables of the system may necessitate a change of the circuit constants in a manner understood by all those skilled in the art.

Although the present invention has been described in terms of various illustrative embodiments it should be realized that the invention and its several features are susceptible of embodiment in a wide variety of other forms. Hence the invention is to be understood as comprehending such other forms as may fairly come within the spirit and letter of the appended claims. For example, the wave transforming circuit designated the lobing detector is not limited to use in radar systems but may be used in any arrangement wherein it is desired to produce a wave of the general form shown in Fig. 7 from a wave of the general type shown in Fig. 6. Moreover, while in the arrangements of Fig. 2 and Fig. 5, the condenser 108 is charged by the "clearing-out" pulse and discharged by the incoming echo pulses, it is obvious that in a modification, the condenser 108 can be discharged to a reference potential and then charged by an amount depending on the amplitude of the echo pulse. In another modification, the "clearing out" pulse can be caused to return the condenser 108 to a potential which is not constant but rather varies in accordance with some modulation which it is desired to combine with the received signal. In the claims, the term "reference level" is intended to mean either a constant potential or one which varies in a desired manner.

What is claimed is:

1. In combination, a rotating element the axis of which it is desired to keep aimed at an object, means including said element for forming a voltage wave comprising a plurality of short pulses of varying amplitude but of the same polarity spaced apart by time intervals which are long compared to the duration of a pulse, said voltage wave having a low frequency envelope, means for generating two reference waves by the rotation of said element, said reference waves being 90 degrees displaced from one another and of the same frequency as the envelope in said voltage wave, separate motor means for shifting the position of the axis of said rotating element through horizontal and vertical angles, means for modifying the said voltage wave to a wave comprising a plurality of steps, each step corresponding in amplitude to that of a pulse in said voltage wave and the steps being separated by time intervals which are short compared to the duration of each step, means for comparing the phase of said stepped wave and each of said reference waves to produce two signal voltages the amplitude and direction of which varies with the error in printing said element towards said object in vertical and horizontal angles, respectively, and means for utilizing said two signal voltages to drive said two motor means to shift the position of the axis of said rotating element in such a direction as to reduce the error in horizontal and vertical angles to substantially zero.

2. The combination of elements as in claim 1 in which said means for modifying said voltage wave comprise a storage element, means for conditioning said storage element by varying the amount of energy stored therein until it reaches a reference level before the occurrence of each pulse in said voltage wave, and means for applying each pulse to the storage element to vary the amount of energy stored therein by an amount depending on the intensity of that pulse.

3. The combination of elements as in claim 1 in which each pulse in said voltage wave is produced by reflection from the object of a radio frequency pulse transmitted from said rotating element.

BERNARD M. OLIVER.

REFERENCES CITED

The following references are of record in the file of this patent:

UNITED STATES PATENTS

| Number | Name | Date |
|---|---|---|
| 2,313,966 | Poch | Mar. 16, 1943 |
| 2,314,029 | Bond et al. | Mar. 16, 1943 |
| 2,412,612 | Godet | Dec. 17, 1946 |
| 2,420,334 | White | May 13, 1947 |
| 2,421,028 | King | May 27, 1947 |